United States Patent
Koefinger et al.

(10) Patent No.: US 8,226,033 B2
(45) Date of Patent: Jul. 24, 2012

(54) FRAME ELEMENT, STORAGE BIN AND METHOD FOR INSTALLING A STORAGE BIN IN AN AIRCRAFT

(75) Inventors: Christian Koefinger, Kufstein (DE); Joachim Metzger, Oepfingen (DE); Michael Auburger, Erlenmoos (DE)

(73) Assignee: Airbus Deutchland GmbH, Hamburg (DE)

( * ) Notice: Subject to any disclaimer, the term of this patent is extended or adjusted under 35 U.S.C. 154(b) by 83 days.

(21) Appl. No.: 12/380,066

(22) Filed: Feb. 23, 2009

(65) Prior Publication Data
US 2009/0230244 A1 Sep. 17, 2009

Related U.S. Application Data

(63) Continuation of application No. PCT/EP2007/006577, filed on Jul. 24, 2007.

(60) Provisional application No. 60/827,302, filed on Sep. 28, 2006.

(30) Foreign Application Priority Data

Aug. 22, 2006 (DE) .......................... 10 2006 039 291

(51) Int. Cl.
*B64D 11/00* (2006.01)
(52) U.S. Cl. ..................................... 244/118.5; 312/247
(58) Field of Classification Search ............... 244/118.1, 244/118.5; 312/131, 198, 199, 247; 248/222.51
See application file for complete search history.

(56) References Cited

U.S. PATENT DOCUMENTS

| | | | |
|---|---|---|---|
| 5,108,048 A | 4/1992 | Chang | |
| 6,112,913 A * | 9/2000 | Rindoks et al. | 211/90.02 |
| 6,536,710 B1 | 3/2003 | Bobzien et al. | |
| 6,598,829 B2 * | 7/2003 | Kamstra | 244/118.1 |
| 6,733,061 B1 | 5/2004 | Dykema et al. | |
| 6,883,753 B1 * | 4/2005 | Scown | 244/118.1 |
| 7,527,221 B2 | 5/2009 | Humfeldt et al. | |
| 2005/0184194 A1 | 8/2005 | Schaefer et al. | |

(Continued)

FOREIGN PATENT DOCUMENTS

DE 10 2004 042 080 3/2006

(Continued)

OTHER PUBLICATIONS

International Search Report, PCT/EP2007/006577, Airbus Deutschland Gmbh, The International Searching Authority/European Patent Office, Nov. 6, 2007.

(Continued)

*Primary Examiner* — Rob Swiatek
(74) *Attorney, Agent, or Firm* — Krieg DeVault LLP

(57) ABSTRACT

A frame element (10) for use in an aircraft component installation system (46) is attachable to an aircraft structure (36) and comprises a storage bin fastening device which is designed to fasten a storage bin (26) at various positions on the frame element (10). A storage bin (26) for use in an aircraft comprises a complementary device to the storage bin fastening device of the frame element (10), in order to fasten the storage bin (26) at various positions on the frame element (10). In a method for the installation of a storage bin (26) in an aircraft a frame element (10) is provided. A storage bin (26) is fastened in a desired position on the frame element (10). The frame element (10) is attached to an aircraft structure (36).

19 Claims, 2 Drawing Sheets

U.S. PATENT DOCUMENTS

Figure 1:
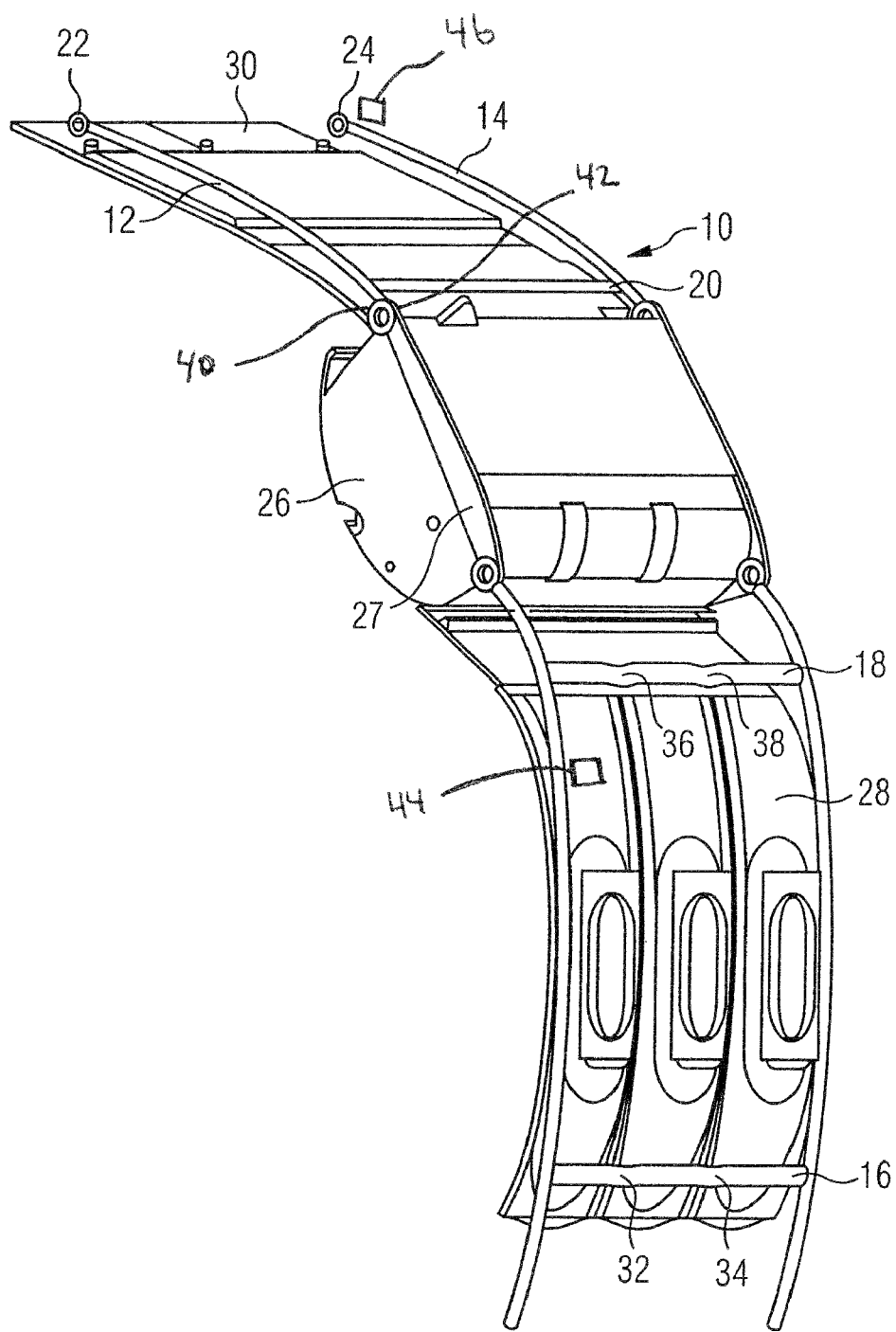

2006/0086886 A1  4/2006  Humfeldt et al.

FOREIGN PATENT DOCUMENTS

| EP | 1281614 | 2/2003 |
| RU | 1519121 | 5/1996 |
| RU | 2 116 933 C1 | 8/1998 |
| RU | 2 235 663 C2 | 9/2004 |
| WO | WO 2006/083314 | 8/2006 |

OTHER PUBLICATIONS

English Translation of Russian Office Action, 2009107008/11(009419), Russian Patent and Trademark Agency, May 26, 2011.

English language abstract of SU 151912, May 20, 1996.

English language translation of Decision on Granting from the Russian Federal Service for Intellectual Property Patents and Trademarks, Application No. 2009107008/11(009419), Sep. 27, 2011.

English Abstract of RU 2 235 663 C2.

English Abstract of RU 2 116 933 C1.

The Federal Service for Intellectual Property, Patents and Trademarks, Decision on Granting, RU2009107008/11(009419), Sep. 27, 2011.

\* cited by examiner

FRAME ELEMENT, STORAGE BIN AND METHOD FOR INSTALLING A STORAGE BIN IN AN AIRCRAFT

CROSS REFERENCE TO RELATED APPLICATIONS

The present application is a continuation application of PCT/EP2007/006577 filed Jul. 24, 2007, which claims priority to German Patent Application No. 10 2006 039 291.4, filed Aug. 22, 2006, and which the claims the benefit of U.S. Provisional Patent Application No. 60/827,302, filed Sep. 28, 2006, each of which is incorporated herein by reference.

The present invention relates to a frame element for use in an aircraft component installation system, a storage bin and a method for installing a storage bin in an aircraft.

When installing storage bins in an aircraft it is customary at the present time to connect the storage bins individually to the aircraft structure. In this connection the storage bins each are in secured at a certain height corresponding to the fuselage (aircraft body) geometry. Since each storage bin has to be positioned and fastened to the aircraft structure separately, the installation of the storage bins is often very time-consuming. Furthermore, alterations to the position and/or design are often very difficult to realise, since such alterations as a rule require an adaptation of a holder on the aircraft structure side and/or at least an adaptation of the fastening points provided on the aircraft structure for the installation of the storage bins.

The object of the invention is to provide a frame element for use in an aircraft component installation system, a storage bin and a method for installing a storage bin in an aircraft, which allow a simple and rapid installation of the storage bin in the aircraft.

In order to achieve this object, a frame element according to the invention for use in an aircraft compartment installation system is attachable on an aircraft structure and comprises a storage bin fastening device which is designed to fasten a storage bin at various positions on the frame element.

The frame element is preferably designed to be screwed to the aircraft structure. For example, it is possible to fasten the frame element to the aircraft structure by means of four screw connections. For this purpose corresponding holes optionally provided with a thread can be drilled in the aircraft structure and/or in the frame element.

In order to permit a particularly simple installation of the frame element on the aircraft structure, the frame element may also be designed so that it can be fastened at one end by means of a socket connection and at the other end by means of a screw connection or catch connection to the aircraft structure. A frame element designed in this way could also be removed in a particularly simple manner from the aircraft structure. A particularly high ease of installation is achieved if a structural part of the frame element or of the aircraft structure serving for the formation of the socket connection is designed in an articulated manner.

The frame element preferably consists of a light and rigid material, such as for example aluminium glass-fibre reinforced plastic, carbon-fibre reinforced plastic or some other carbon fibre material.

When using the frame element according to the invention to join a storage bin to the aircraft structure, the storage bin may first of all be fastened in the desired position on the frame element, i.e. the frame element and the storage bin can be pre-assembled to form an independently manipulable structural group. The pre-assembled structural group consisting of the frame element and the storage bin fastened thereto can then be connected in a simple and quick manner to the aircraft structure.

In order to fasten the storage bin to the frame element, a holder, a clamp or a catch device may be provided on the frame element, which also may be formed integral with the frame element. These devices each may be arranged so as to co-operate with complementary devices provided on the storage bin. It is however also possible to screw the storage bin to the frame element, in which case corresponding holes, if necessary provided with a thread, may be provided in the storage bin and/or in the frame element. For example, it is possible to provide a plurality of holes arranged at different positions in the frame element, so that in each case corresponding holes can be selected so as to attach the storage bin at the desired position on the frame element. Alternatively, a catch mechanism designed having a threaded rod is for example also conceivable.

A particular advantage of the frame element according to the invention is that it can serve as a carrier element for a storage bin to be attached at various positions. In this way the number as well as the arrangement of the fastening points for the storage bin provided on the aircraft structure no longer have to match storage bin positions corresponding to different customer requirements, but simply have to match the frame element carrying the storage bin. The frame element according to the invention thus permits a decoupling of the fastening points provided on the storage bin from the fastening points provided on the aircraft structure. Consequently, the number of possible fastening points to be provided on the aircraft structure for the storage bin can be significantly reduced by using the frame element according to the invention. In addition it is possible to standardise the arrangement of the fastening points for the storage bin on the aircraft structure.

Since a matching of the fastening points on the storage bin side to the fastening points on the aircraft structure side can be dispensed with by using the frame element according to the invention, an improved flexibility in the design of the storage bin as well as of the aircraft structure can be achieved. This increased flexibility can be utilised to optimise the weight of the storage bin and/or of the aircraft structure.

According to a preferred embodiment of the invention the frame element comprises a guide device, which is designed to guide a displacement of the storage bin on the frame element. The displacement of the storage bin on the frame element is preferably possible in a restricted region of the frame element identified as the storage bin region. In this way the storage bin can for example first of all be displaceably mounted on the frame element and can then be displaced in a simple manner along the guide device to a desired position. Following this the storage bin can be fastened at the desired position to the frame element.

The guide device is preferably formed by two longitudinal struts of the frame element arranged at least in sections substantially parallel to one another. The length of the longitudinal struts of the frame element may be varied depending on requirements. In this way the geometry of the frame element may also be varied as desired. For example, the frame element can extend from a plane forming the floor of an aircraft cabin up to a centre line of the aircraft cabin ceiling. Alternatively, a frame element is also conceivable that extends from one side of the plane forming the floor of an aircraft cabin to the opposite side of the plane forming the floor of an aircraft cabin, i.e. the frame element spans both sides of the aircraft cabin as well as the aircraft cabin ceiling. In the mounted state of the frame element the longitudinal struts of the frame element can extend parallel to ribs of the aircraft structure.

The longitudinal struts therefore preferably have a curvature that matches a curvature of the ribs of the aircraft structure.

Preferably the frame element according to the invention furthermore comprises at least one connecting strut extending at least in sections between the longitudinal struts. Depending on the length of the longitudinal struts the frame element may comprise a corresponding number of connecting struts so as to ensure a sufficient rigidity of the frame element.

For example, the frame element may be dimensioned so that the longitudinal struts in the mounted state of the frame element extend parallel to adjacent ribs of the aircraft structure. Alternatively, the frame element may however also be of such a size that the distance of the longitudinal struts of the frame element from one another is greater than the distance between two adjacent ribs of the aircraft structure. In this case the connecting strut of the frame element is preferably provided with at least one recess, which after the attachment of the frame element to the aircraft structure co-operates with a rib of the aircraft structure in such a way that the rib is accommodated in the recess provided in the connecting strut. In this way the rib, which in the mounted state of the frame element is arranged between the longitudinal struts of the frame element, is prevented in a simple way from interfering in the fastening of the frame element to the aircraft structure. If the frame element comprises a plurality of connecting struts, then preferably each connecting strut is provided with at least one recess which in the mounted state of the frame element accommodates a rib of the aircraft structure. In a particularly preferred embodiment of the frame element according to the invention a connecting strut comprises two recesses for accommodating two adjacent ribs.

Preferably at least one force application device designed for example in the shape of a clip is formed on the frame element for attaching the frame element to the aircraft structure. For example, at least one force application device may be provided on each longitudinal strut of the frame element, through which a screw or a bolt can be guided, so as to connect the frame element in a simple and reliable manner to the aircraft structure. Depending on the size of the frame element and the length of the longitudinal struts of the frame element, respectively, a plurality of force application devices may also be formed on the frame element for attaching the frame element to the aircraft structure. For example, a plurality of force application devices may be arranged distributed along the length of the longitudinal struts of the frame element, so as to ensure a reliable fastening of the frame element to the aircraft structure.

In a preferred embodiment of the invention the frame element attachable to the aircraft structure via shock mounts. Shock mounts are understood in this connection to denote bearings consisting of a vibration-damping material, for example a rubber-elastic material, and which provide a shock-free fastening of the frame element, and thus of the interior structural part attached to the frame element, to the aircraft structure. An acoustic decoupling of the frame element from the aircraft structure is achieved by the fastening of the frame element via shock mounts. The shock mounts may for example be positioned between the force application devices formed on the frame element and the components of the aircraft structure, such as for example the ribs, provided for the fastening of the frame element. It is however possible to provide all the fastening devices described above for fastening the frame element to the aircraft structure, with corresponding shock mounts so as to acoustically decouple the frame element from the aircraft structure.

Suitable through holes are preferably provided in the shock mounts, which enable a screw or a bolt to be guided through the shock mounts so as to fasten the frame element to the aircraft structure. Alternatively, suitable elastic bushings may also be provided in the shock mounts for connecting the shock mounts to the frame element.

Apart from the storage bins, at the present time also other interior components, such as for example dado panels, side panels, light strips and the like in the installation in an aircraft are connected individually to the aircraft structure. The frame element according to the invention therefore preferably further comprises at least one fastening device for fastening at least one further aircraft interior component to the frame element. The frame element may be designed as one piece and dimensioned so that the storage bin as well as the at least one further aircraft interior component can be fastened to the frame element. Alternatively, it is however also possible to design the frame element as two or more parts, and for example to use a first frame element section for installing the storage bin and a second frame section for installing the aircraft interior component. Furthermore, the frame element may also comprise a plurality of fastening devices for fastening more than one interior component to the frame element.

As fastening device for fastening the at least one further interior component to the frame element, a holder, a clamp or a catch device may be provided on the frame element, which may also be formed integral with the frame element. Alternatively however, it is also possible to screw or rivet the interior component to the frame element, in which case suitable holes, if necessary provided with a thread, may then be drilled in the interior component and/or in the frame element.

Whereas the primary insulation is directly attached to the inner face of the aircraft outer shell (skin), the insulation packages forming the secondary insulation of the aircraft are normally bonded to the interior structural parts of the aircraft, before these are fastened to the aircraft structure. In order to reproduce the contour of the interior components, which is often curved and is provided with stepped portions and the like, a plurality of variously shaped insulation packages are often necessary. The installation of the secondary insulation is therefore time-consuming and cost-intensive.

According to a particularly preferred embodiment of the invention the frame element therefore further comprises at least one further fastening device for the fastening at least one insulation package to the frame element. In other words, the frame element is designed so that it can be pre-assembled with a storage bin, optionally with at least one further interior component as well as with at least one insulation package forming for example part of the aircraft secondary insulation, so as to form an independently manipulable structural group. This structural group can then be attached in a simple manner and way, as described above, to the aircraft structure. The frame element is at the same time preferably designed so that the storage bin fastened to the frame element and optionally the at least one further interior component is/are arranged in the mounted state of the structural group consisting of the frame element, the storage bin, possibly the further interior component and the insulation package, on a side of the frame element facing away from the aircraft structure. The insulation package may on the other hand in the mounted state of the structural group be arranged either on a side of the frame element facing towards the aircraft structure, between the frame element and the aircraft structure, or may be fastened between the storage bin and the further interior component and the frame element on the side of the frame element facing away from the aircraft structure.

The complicated and costly bonding of the insulation packages to the interior structural parts can be dispensed with by using the frame element according to the invention in the installation of the insulation packages forming for example the secondary insulation of the aircraft. In particular, the frame element has compared to most aircraft interior components a significantly simpler contour without any stepped portions and the like, which means that fewer individually designed insulation packages have to be used. Significant cost savings can thereby be achieved.

The further fastening device for fastening at least one insulation package to the frame element is preferably arranged so as to fasten the insulation package in a mechanically detachable manner to the frame element.

For example, the further fastening device may be designed in the form of a catch-type closure, a Velcro-type strip, a mushroom-type strip or a Christmastree-type fastening device. Alternatively, it is also possible to fasten the insulation package to the frame element by means of screws, rivets, clips, clamping devices, magnetic holders, spring-loaded pressure closures, expansion-type fastening devices, retaining buttons or spherical fastening devices. Furthermore, it is conceivable to suspend the insulation package on fastening points that are provided on the frame element, or to design the insulation package somewhat larger than the frame element so as to be able to bend the insulation package around the frame element and to fasten the insulation package to the frame element by means of a rubber strip. Finally, the device for fastening the frame element according to the invention to the aircraft structure may also be designed so that it permits at the same time the fastening of the insulation package to the frame element.

A storage bin according to the invention for use in an aircraft comprises a device, complementary to the storage bin fastening device of the frame element, in order to mount the storage bin at various positions on the frame element.

The storage bin according to the invention preferably comprises a rail formed on a side wall or a rear wall of the storage bin, which is designed to co-operate with a guide device, i.e. preferably with a longitudinal strut of the frame element. The rail is preferably configured so that the longitudinal strut of the frame element can be accommodated in the rail, in order that the storage bin can be displaced on the frame element along the longitudinal strut of the frame element. Preferably a rail is provided on each side wall of the storage bin, so that the two longitudinal struts of the frame element, arranged substantially parallel to one another, each can be accommodated in a rail.

A method according to the invention for installing a storage bin in an aircraft comprises the steps of providing a frame element as described above, fastening a storage bin at a desired position to the frame element, and attaching the frame element to an aircraft structure. In the method according to the invention for installing a storage bin in an aircraft, the storage bin can first of all be fastened at the desired position to the frame element and the frame element, with the storage bin fastened thereto, can then be attached to the aircraft structure. Alternatively however, it is also conceivable to attach the frame element first of all to the aircraft structure and only then fasten the storage bin at the desired position to the frame element.

In a preferred embodiment of the method according to the invention the storage bin, before its fastening to the frame element, is moved along a guide device on the frame element to the desired position. The guide device is preferably formed by two longitudinal struts of the frame element arranged substantially parallel to one another. For example, the storage bin can be placed on the frame element, displaced along the guide device to the desired position, and then fastened to the frame element. The frame element together with the storage bin fastened thereto can then be attached to the aircraft structure. Alternatively however it is also possible to place the storage bin on the frame element and then attach the frame element to the aircraft structure. The position of the storage bin can then be adjusted by displacing the storage bin along the guide device, and the storage bin can finally be fastened at the desired position to the frame element.

Preferably the frame element is attached to the aircraft structure by means of a force application device formed on the frame element, in which connection such a force application device may be provided on each longitudinal strut of the frame element.

The frame element may be attached to the aircraft structure in such a way that a recess provided in a connecting strut of the frame element accommodates a rib of the aircraft structure.

The frame element can be attached to the aircraft structure via shock mounts.

In a preferred embodiment of the method according to the invention, before the frame element is attached to the aircraft structure at least one further interior component, for example a dado panel, a ceiling panel, a door frame part, a side panel, a light strip or the like, is fastened to the frame element.

Finally, the method according to the invention may envisage that at least one insulation package is fastened to the frame element before the frame element is attached to the aircraft structure.

Figure 2:
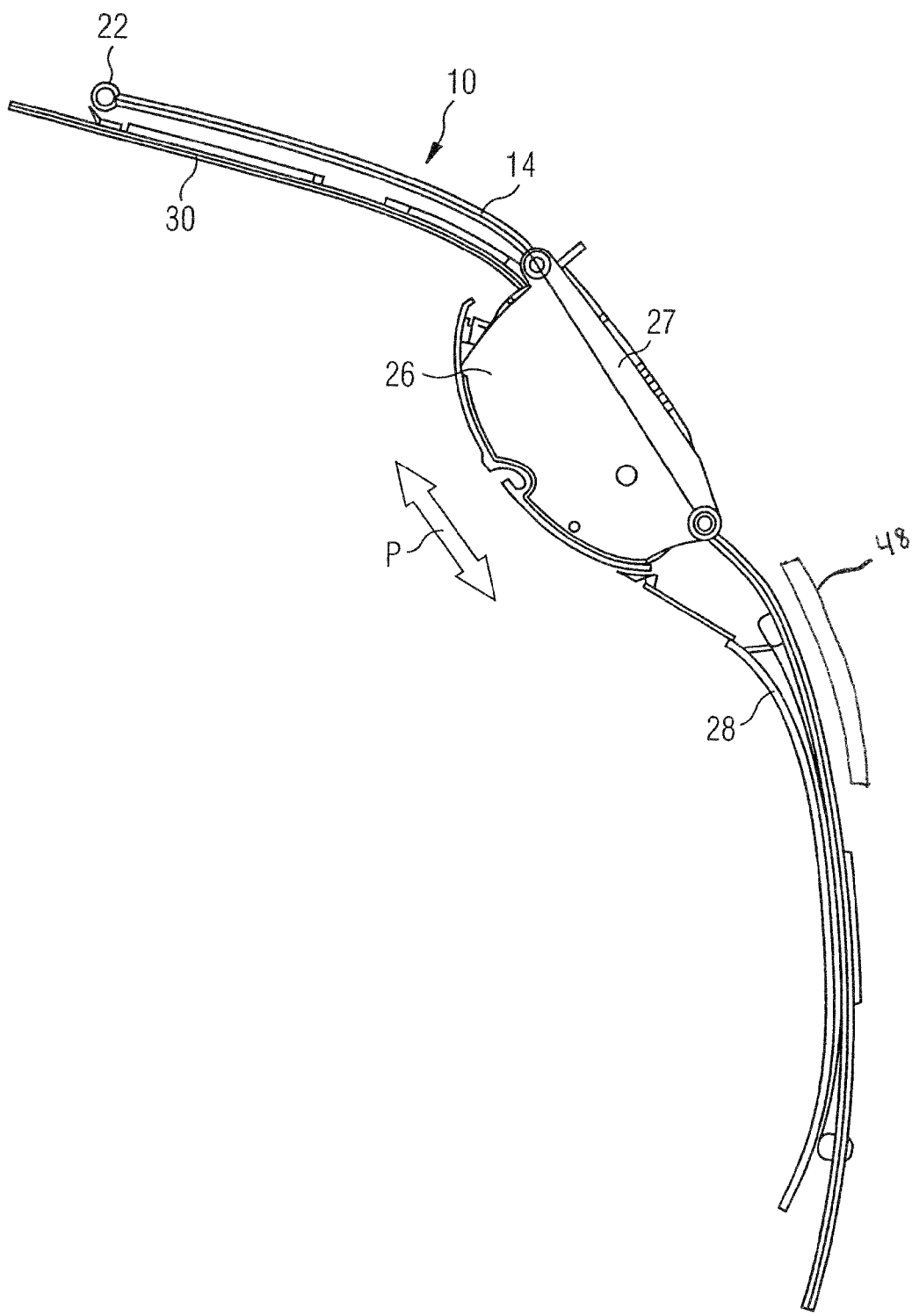

A preferred embodiment of the invention is described in more detail hereinafter with the aid of the accompanying diagrammatic drawings, in which:

FIG. 1 is a three-dimensional view of a frame element according to the invention with a storage bin fastened thereon, a side panel fastened thereon and a ceiling panel fastened thereon, and FIG. 2 is a side view of the frame element according to the invention with a storage bin fastened thereon, a side panel fastened thereon and a ceiling panel fastened thereon.

FIGS. 1 and 2 show a frame element 10 made of aluminum, which includes two curved longitudinal struts 12, 14 arranged parallel to one another, as well as three connecting struts 16, 18, 20 extending parallel to one another between the aforementioned longitudinal struts 12, 14. A force application device 22, 24 is formed on a first end of each longitudinal strut 12, 14 of the frame element 10. The frame element 10 comprises a storage bin fastening device, an embodiment of which is shown by reference numeral 40, which serves to fasten a storage bin 26 at different positions on the frame element 10. A holder, a clamp or a catch device may serve as storage bin fastening device for fastening the storage bin 26 to the frame element 10. Alternatively it is however also possible to screw or rivet the storage bin 26 to the frame element 10, in which case corresponding holes, if necessary provided with a thread, and arranged at different positions, are then provided in the storage bin 26 and/or in the frame element 10. An embodiment of a complementary fastening device is shown by reference numeral 42.

In the region of the storage bin 26 the longitudinal struts 12, 14 of the frame element 10 are accommodated in rails 27 formed on side walls of the storage bin 26, so that the storage bin 26, as indicated by the arrow P in FIG. 2, can be moved on the frame element 10 along the longitudinal struts 12, 14 of the frame element 10 in a storage bin region.

The frame element 10 further includes fastening devices, an embodiment of which is shown by reference numeral 44, which serve to fasten a side panel 28 as well as a ceiling panel 30 to the frame element 10. In this case too a holder, a clamp or a catch device in each case may serve as fastening device for fastening the side panel 28 and the ceiling panel 30 to the frame element 10. Alternatively it is however also possible to screw or rivet the interior components 28, 30 to the frame element 10, in which case corresponding holes, if necessary provided with a thread, are then formed in the interior components 28, 30 and/or in the frame element 10.

By means of the force application devices 22, 24 formed on the longitudinal struts 12, 14 of the frame element 10, the frame element 10 can be fastened on a side of an aircraft structure facing towards an interior space of an aircraft, to the aircraft structure. For this purpose a screw is passed through each of the force application devices 22, 24 formed on the longitudinal struts 12, 14 of the frame element 10 and screwed into a hole provided with a thread, formed in a rib of the aircraft structure.

The fastening of the frame element 10 to the aircraft structure is effected via shock mounts, i.e. bearings of a vibration-damping material, which ensure a shock-free fastening of the frame element 10 to the aircraft structure. An embodiment of a shock mount 46 can be seen in FIG. 1. The shock mounts formed of a rubber-elastic material are each provided with a through opening, through which can be guided the screws serving to fasten the structural group consisting of the frame element 10, the storage bin 26 and the interior structural part 28, 30 to the aircraft structure. An acoustic decoupling of the frame element 10 and thus of the storage bin 26 and the interior structural parts 28, 30 from the aircraft structure can be achieved by means of the shock mounts.

The curvature of the longitudinal struts 12, 14 of the frame element 10 is matched, at least in sections, to a curvature of the ribs of the aircraft structure, so that the longitudinal struts 12, 14 of the frame element 10 in the mounted state of the frame element 10 extend parallel to the ribs. Ribs of the aircraft structure lying between the ribs used for the fastening of the frame element 10 are, in the mounted state of the frame element 10, accommodated in recesses 32, 34, 36, 38 provided on the connecting struts 16, 18 of the frame element 10, so that these ribs do not interfere in the fastening of the frame element 10 to the aircraft structure.

The frame element 10 further comprises a further fastening device, not shown in the figures, for the mechanically detachable fastening to the frame element 10 of an insulation package 48 forming a part of an aircraft secondary insulation. In the mounted state of the frame element 10 the storage bin 26, the side panel 28 and the ceiling panel 30 are fastened on a side of the frame element 10 facing towards an interior space of an aircraft, whereas the insulation package is attached to a side of the frame element 10 facing away from the interior space of the aircraft.

In the mounted state of a structural group consisting of the frame element 10, the storage bin 26, the side panel 28, the ceiling panel 30 and the insulation package, the insulation package is arranged between the frame element 10 and the aircraft structure, so that the insulation package might be compressed in the region of the contact surface of the insulation package with a rib or another component of the aircraft structure. The material of the insulation package is however sufficiently elastic, so that the insulation package does not suffer any damage. Alternatively, the insulation package may also be provided with corresponding recesses for accommodating a rib or another component of the aircraft structure.

In the installation of the frame element 10 the storage bin 26 is first of all placed on the frame element 10 and displaced along the longitudinal struts 12, 14 of the frame element 10 to the desired position. The storage bin 26 is then fastened to the frame element 10 at the desired position. Following this the interior components 28, 30 are fastened to the frame element 10 and the insulation package is mechanically detachably attached to the frame element 10.

The structural group consisting of the frame element 10, the storage bin 26, the interior components 28, 30 and the insulation package is then fastened to the aircraft structure, in which connection screws are guided through the force application devices 22, 24 provided on the longitudinal struts 12, 14 of the frame element 10 and are screwed into holes formed in the ribs of the aircraft structure and each being provided with a thread. The structural group consisting of the frame element 10, the storage bin 26, the interior components 28, 30 and the insulation package is decoupled acoustically from the aircraft structure by means of the fastening via shock mounts.

The invention claimed is:

1. Arrangement for use in an aircraft component installation system, the arrangement comprising:
    a frame element (10) which is attachable to an aircraft structure and which comprises two longitudinal struts (12, 14) which, at least in sections, are substantially parallel to one another, and which have a curvature that is matched to the curvature of ribs of the aircraft structure, such that the longitudinal struts (12, 14), in the mounted state of the arrangement, extend, at least in sections, substantially parallel to the ribs of the aircraft structure, and
    a storage bin (26), wherein
    the frame element (10) comprises a storage bin fastening device and the storage bin
    comprises a device which is designed complementary to the storage bin fastening device of the frame element (10), and wherein the storage bin fastening device of the frame element (10) and the device of the storage bin (26) are adapted to rigidly fasten the storage bin (26) directly slidably to the longitudinal struts at one of a number of various positions along the longitudinal struts (12, 14) of the frame element (10).

2. Arrangement according to claim 1, characterised in that the two longitudinal struts (12, 14) of the frame element (10), which at least in sections are substantially parallel to one another, form a guide device being designed to guide a displacement of the storage bin (26) in a storage bin region on the frame element (10).

3. Arrangement according to claim 2, characterised in that the frame element (10) further includes at least one connecting strut (16, 18, 20) extending at least in sections between the longitudinal struts (12, 14).

4. Arrangement according to claim 3, characterised in that the connecting strut (16, 18, 20) of the frame element (10) is provided with at least one recess (32, 34, 36, 38) which, after the attachment of the frame element (10) to the aircraft structure, accommodates a rib of the aircraft structure.

5. Arrangement according to claim 3, characterised in that at least one force application device (22, 24) for attaching the frame element (10) to the aircraft structure is formed on each longitudinal strut (12, 14) of the frame element (10).

6. Arrangement according to claim 2, characterised in that at least one force application device (22, 24) for attaching the frame element (10) to the aircraft structure is formed on each longitudinal strut (12, 14) of the frame element (10).

7. Arrangement according to claim 2, characterised in that the frame element (10) is attachable to the aircraft structure via shock mounts.

8. Arrangement according to claim 2, characterised in that the frame element (10) further comprises at least one fastening device for fastening at least one further aircraft interior component (28, 30) to the frame element (10).

9. Arrangement according to claim 1, characterised in that the frame element (10) is attachable to the aircraft structure via shock mounts.

10. Arrangement according to claim 1, characterised in that the frame element (10) further comprises at least one fastening device for fastening at least one further aircraft interior component (28, 30) to the frame element (10).

11. Arrangement according to claim 1, characterised in that the frame element (10) further comprises at least one further fastening device for fastening at least one insulation package to the frame element (10).

12. Arrangement according to claim 1, characterised in that the storage bin (26) includes a rail (27) formed on a side wall or on a rear wall of the storage bin (26), which rail is designed to co-operate with a longitudinal strut (12, 14) of the frame element (10).

13. Method for the installation of a storage bin (26) in an aircraft, comprising the following steps:
- providing an arrangement according to claim 1,
- rigidly fastening a storage bin (26) directly slidably to the longitudinal struts in a desired position along the longitudinal struts (12, 14) of the frame element (10) to the frame element (10), and
- attaching the frame element (10) to an aircraft structure, such that the longitudinal struts (12, 14) of the frame element (10), which have a curvature that is matched to the curvature of ribs of the aircraft structure, extend, at least in sections substantially parallel to the ribs of the aircraft structure.

14. Method according to claim 13, characterised in that the storage bin (26) is, before its fastening to the frame element (10), moved along a guide device formed by the two longitudinal struts (12, 14) of the frame element (10) arranged substantially parallel to one another at least in sections, to the desired position on the frame element (10).

15. Method according to claim 14, characterised in that the frame element (10) is attached to the aircraft structure by means of a force application device (22, 24) formed on each longitudinal strut (12, 14) of the frame element (10).

16. Method according to claim 13, characterised in that the frame element (10) is attached in such a way to the aircraft structure that a recess (32, 34, 36, 38) provided in a connecting strut (16, 18, 20) of the frame element (10) accommodates a rib of the aircraft structure.

17. Method according to claim 13, characterised in that the frame element (10) is attached to the aircraft structure via shock mounts.

18. Method according to claim 13, characterised in that before attaching the frame element (10) to the aircraft structure at least one further interior component (28, 30) is fastened to the frame element (10).

19. Method according to claim 13, characterised in that before attaching the frame element (10) to the aircraft structure at least one insulation package is fastened to the frame element (10).

* * * * *